April 28, 1931.   J. H. KINTZELE   1,802,975
RETARDER
Filed April 23, 1928
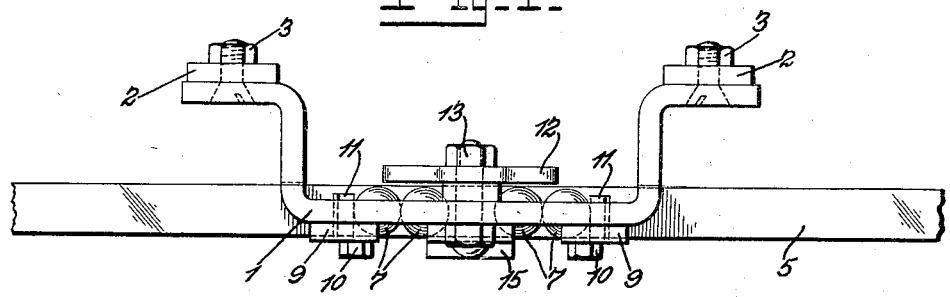
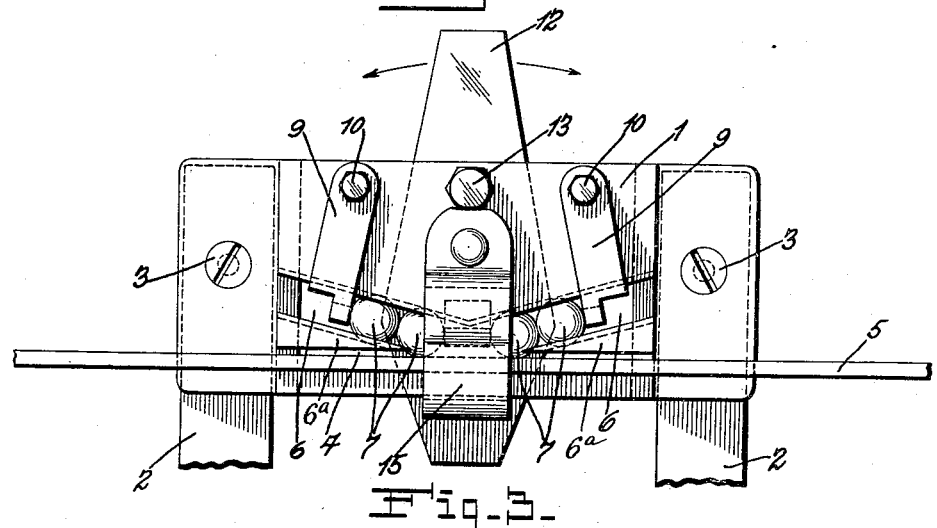
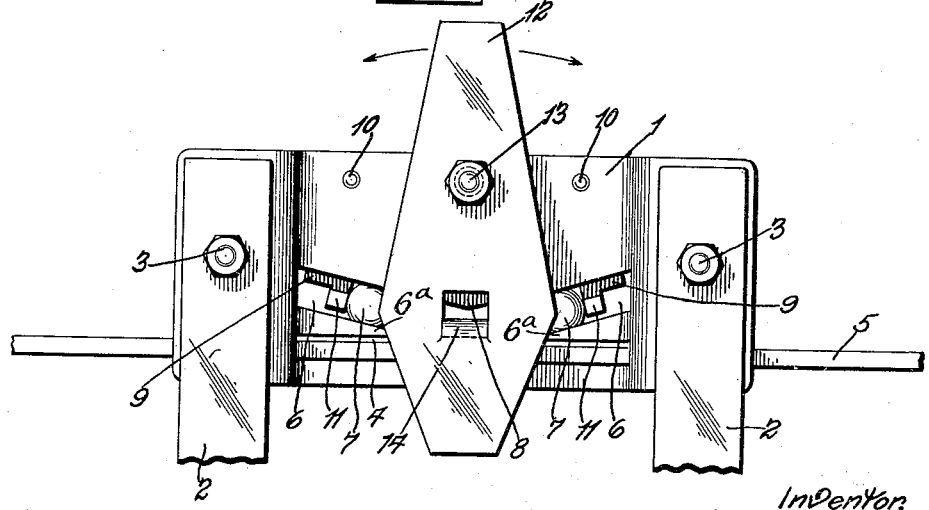
Inventor.
Julius H. Kintzele,
by Rippey & Kingsland.
His Attorneys.

Patented Apr. 28, 1931

1,802,975

UNITED STATES PATENT OFFICE

JULIUS H. KINTZELE, OF ST. LOUIS, MISSOURI, ASSIGNOR TO PAULY JAIL BUILDING COMPANY, OF ST. LOUIS, MISSOURI, A CORPORATION OF MISSOURI

RETARDER

Application filed April 23, 1928. Serial No. 272,124.

This invention relates to a retarder for retarding or preventing lateral movement of one part relative to another.

An object of the invention is to provide a retarder for retarding or preventing lateral movement of one part relative to another part comprising a number of elements mounted in connection with one of said parts and movable to and from positions to engage the other part selectively to prevent movement of either part in one direction, and movable into engagement with said other part to prevent movement of either of said parts in either direction.

Another object of the invention is to provide means for effectively controlling said elements for the purpose of retarding or preventing lateral movements of either part relative to the other.

Other objects will be apparent from the following description taken in connection with the accompanying drawing in which Fig. 1 is a plan view of one form of the invention.

Fig. 2 is a side elevation.

Fig. 3 is an elevation of the opposite side from that shown in Fig. 2.

In the embodiment of the invention shown the part 1 for the retarding elements has its ends attached to members 2 by fasteners 3. The intermediate portion of the part 1 extends laterally from the members 2 and has a longitudinal slot 4 through which the horizontal part 5 extends. In the specific embodiment shown the part 1 and the members 2 in connection therewith are designed and adapted for lateral movements with respect to the part 5 but it will be apparent that it is within the scope of the present invention if the part 5 be made movable and the part 1 stationary.

The part 1 is formed with a pair of upwardly diverging inclined slots 6 which intersect and open into the slot 4 at the intersection of said slots 6 with each other. The lower walls of the slots 6 are formed by the attenuated portions 6ª which are between the slots 4 and 6. A number of balls 7 is mounted in each of the slots 6. These balls 7 are of hard metal and naturally roll downwardly in the respective slots 6 so that the lowermost ball in each of said slots 6 engages upon the part 5 (Fig. 2). Either the upper or lower wall or both the upper and lower walls of each slot 6 may be grooved longitudinally so as to provide raceways for the balls 7 to prevent said balls from becoming dislodged after the device is assembled. Further, the width of each slot 6 at each side of the part 1 is less than the diameter of the balls 7, so that it is impossible for the balls to roll or move laterally from said slots, as will be understood by reference to Fig. 2. The point 8 at the intersection of the slots 6 is spaced from the upper side of the part 5 a less distance than the diameter of the balls 7 so that it is impossible for the balls 7 to pass from either of the slots 6 to the other end of said slots. Because of this construction it will be understood that when a ball 7 in each of the slots 6 is seated upon the part 5 neither the part 1 nor the part 5 can be moved laterally relatively to the other one of said parts. For, if such lateral movement be attempted, one or the other of the balls 7 will become clamped or wedged upon the part 5 by the upper inclined wall of the slot 6 in which the ball is mounted, thus positively preventing lateral movement of the part 1 or the part 5.

A stop and downward impeller for the balls 7 in each slot is provided. As shown, each of these impellers comprises an arm 9 suspended for free swinging movements on a pivot 10. The lower end 11 of each arm 9 projects laterally into or through the adjacent slot 6 above the balls 7 and by gravity tends to impel or actuate the balls 7 downwardly to the intersection of the slots 6 and into contact with the part 5. Lateral swinging movements of the arm 9 in directions away from each other will, of course, be stopped and limited by engagement of the projections 11 with the upper walls of the slots 6, thereby forming abutments or stops for said balls 7 to prevent the balls from rolling upwardly out of the respective slots. The pivots 10 may be in the form of screws and removable and replaceable so as to facilitate removal of the arms 9 to permit removal or replacement of the balls, or for any other desired purpose.

These balls 7 may be controlled to permit movement of the parts 1 or 5 relative to each other and in either direction as desired. A lever 12 is mounted on a pivot 13 on the part 1 and is formed with an arm 14 projecting into the slots 6 at their intersection when said lever 12 is in its intermediate position. The arm 14 extends between the lowest balls 7 in the respective slots 6, but permits said lowest balls 7 to seat upon the part 5 when said lever 12 is in its intermediate position to prevent relative lateral movement of the parts 1 and 5. Obviously, clockwise movement of the levers 12 (Fig. 2) will cause the arm 14 to push the balls 7 in the slot 6 at the left upwardly into said slot 6 and out of engagement with the part 5 and will permit the lowest ball 7 in the slot 6 at the right to obtain clamping engagement with the part 5 and prevent leftward movement of the part 5 relative to the part 1, or prevent movement of the part 1 toward the right relative to the part 5. And movement of the lever 12 in a counterclockwise direction (Fig. 2) will reverse this condition.

This invention may find useful application wherever it is desired to prevent relative lateral movements of such parts as the parts 1 and 5 here shown and will hold said parts in an initial or starting position or in any relative adjustment to which they may be moved. The part 12 may be operated manually as shown or equipped with any suitable connections for this purpose.

A guide and retainer to prevent lateral displacement of the parts 1 and 5 may be provided, the same comprising a bracket 15 attached to the part 1 and extending downwardly beyond the edge of the part 5.

One useful embodiment in which the invention may be used is in connection with a conveyor mounted for movement along a track. The part 5 is a track and the parts 2 are supports for the conveyor. The supports 2 are carried by the part 1 which is mounted for sliding movements along the track 5. To move the device toward the left, for instance, from the position shown in Fig. 2, the lever 12 will be operated to move upwardly into the inclined slot 6 at the left of said lever and to hold said balls 7 in such position during the time that the device is being moved. During such movement the balls 7 in the slot 6 at the opposite side or toward the right of the lever, as shown in Fig. 2, will not interfere with the movement of the device along the track 5. When the device reaches its proper position along the track 5 the lever 12 is released to permit the balls 7 that had been moved upwardly into the slot 6 at the left to return to position in which the lower ball 7 seats upon the track 5. The balls 7 at both sides of the projection 14 are thereby engaged with the track 5 and it is impossible to move the carriage support in either direction along the track 5. To move the device toward the right in Fig. 2 the lever 12 is operated to move upwardly into the slot 6 at the right of the lever 12 the balls that are in said slot and to disengage the lower ball 7 from the track 5. The device is then free to move along the track 5 to the desired position. When the device reaches the desired position the lever 12 is released to permit the lower ball 7 at the right of the lever 12 to reengage the track 5 so that it is then impossible to move the device in either direction along the track 5 until the lever 12 is again operated.

The construction and arrangement of the parts may be varied within equivalent limits without departure from the nature and principle of the invention. I do not restrict myself unessentially, but what I claim and desire to secure by Letters Patent is:

1. A retarder comprising two elements, one of which is movable laterally to different adjusted positions along the other and has an inclined slot therein, a ball mounted in said slot and movable to and from wedging position between the upper wall of said inclined slot and the other element, an actuator for moving said ball downwardly in said slot to gripping position, and a member pivotally mounted on said movable element for moving said ball upwardly into said slot away from said gripping position in opposition to said actuator.

2. A retarder comprising two elements, one of which is movable laterally to different adjusted positions along the other and has therein a pair of slots inclining upwardly in opposite directions, a ball mounted in each of said slots and movable therein to and from wedging position between the upper wall of the slot in which it is mounted and the other element, and a member pivotally mounted on said element in which said slots are formed for moving either of said balls upwardly into the slot in which it is mounted to permit the other one of said balls to remain in gripping contact as aforesaid.

3. A retarder comprising two elements, one of which is movable laterally to different adjusted positions along the other and has therein a pair of slots inclining upwardly in opposite directions, a ball mounted in each of said slots and movable therein to and from wedging position between the upper wall of the slot in which it is mounted and the other element, a member pivotally mounted on said element in which said slots are formed for moving either of said balls upwardly into the slot in which it is mounted to permit the other one of said balls to remain in gripping contact as aforesaid, and a pair of actuators pivotally supported by said slotted element for moving said balls downwardly in said slots to gripping positions.

4. A retarder comprising two elements, one of which is movable to different adjusted positions along the other and has therein a pair of slots inclining upwardly and oppositely, attenuated portions on said slotted element below said slots projecting toward each other, a ball mounted in each of said slots and movable therein downwardly beyond said attenuated portion to gripping engagement between the upper wall of said slot and the other one of said elements, and a member pivoted to said slotted element and projecting between said balls for selectively moving said balls upwardly into said slots onto said attenuated portions.

5. A retarder comprising two elements, one of which is rigid and the other of which is movable laterally to different adjusted positions along said rigid element and has a slot therein inclining upwardly from said rigid element, a ball mounted in said slot in said movable element for movement to and from contact with said rigid element and with the upper wall of said slot, a pivot supported by said movable element, a lever mounted on said pivot, and a projection on said lever at a distance from said pivot extending into said slot for moving said ball upwardly into said slot and out of contact with said rigid element.

6. A retarder comprising two elements, one of which is rigid and the other of which is movable laterally to different adjusted positions along said rigid element and has a slot therein inclining upwardly from said rigid element, a ball mounted in said slot for movement to and from contact with said rigid element and to and from a wedging position between said rigid element and the upper end of said slot to prevent movement of said movable element in one direction along said rigid element, a pivot on said movable element, a lever mounted on said pivot, and a projection on said lever at a distance from said pivot extending into said slot for moving said ball upwardly into said slot and out of contact with said rigid element to permit movement of said movable element along said rigid element.

JULIUS H. KINTZELE.